US010726524B2

(12) United States Patent
Neti et al.

(10) Patent No.: US 10,726,524 B2
(45) Date of Patent: Jul. 28, 2020

(54) LOW-RESOLUTION TILE PROCESSING FOR REAL-TIME BOKEH

(71) Applicant: QUALCOMM Incorporated, San Diego, CA (US)

(72) Inventors: Ravi Kumar Neti, Hyderabad (IN); Babu Chitturi, Hyderabad (IN); Sharath Chandra Nadipalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 15/868,680

(22) Filed: Jan. 11, 2018

(65) Prior Publication Data

US 2019/0213714 A1    Jul. 11, 2019

(51) Int. Cl.
*G06T 5/00* (2006.01)
*G06T 7/194* (2017.01)
*G06T 5/20* (2006.01)
*H04N 5/262* (2006.01)

(52) U.S. Cl.
CPC ............... *G06T 5/002* (2013.01); *G06T 5/20* (2013.01); *G06T 7/194* (2017.01); *H04N 5/2621* (2013.01); *G06T 2207/20221* (2013.01)

(58) Field of Classification Search
None
See application file for complete search history.

(56) References Cited

U.S. PATENT DOCUMENTS

| 9,256,948 | B1   | 2/2016  | Seitz et al. |
| 9,466,113 | B2   | 10/2016 | Pham et al. |
| 9,530,243 | B1 * | 12/2016 | Costello ............... G06T 15/503 |
| 2009/0179998 | A1 * | 7/2009  | Steinberg ............... H04N 5/232 348/222.1 |
| 2012/0280996 | A1 * | 11/2012 | Kannan ................... G06T 15/20 345/426 |
| 2014/0152886 | A1 * | 6/2014  | Morgan-Mar ..... H04N 5/23212 348/349 |
| 2015/0049954 | A1 * | 2/2015  | Hikida .................... G06T 7/194 382/199 |
| 2015/0381965 | A1   | 12/2015 | Atanassov et al. |
| 2017/0091906 | A1   | 3/2017  | Liang et al. |
| 2018/0286059 | A1 * | 10/2018 | Vadakke Matham ... G06T 7/136 |

FOREIGN PATENT DOCUMENTS

EP    3185560 A1    6/2017

* cited by examiner

*Primary Examiner* — Kevin Ky
(74) *Attorney, Agent, or Firm* — Pamela K. Soggu

(57) ABSTRACT

Methods and apparatuses are disclosed for generating real-time bokeh in images. An example method may include receiving an image, partitioning the image into a plurality of tiles, and designating each of the plurality of tiles as one of a fully foreground tile, a fully background tile, and a mixed tile. Either the fully background tiles or the fully foreground tiles may be processed using a tile-based filtering operation to generate a number of replacement tiles, and the mixed tiles may be processed to generate a number of replacement mixed tiles. An output image nay be generated based on the replacement tiles, the replacement mixed tiles, and either unaltered fully foreground tiles or unaltered fully background tiles.

27 Claims, 12 Drawing Sheets

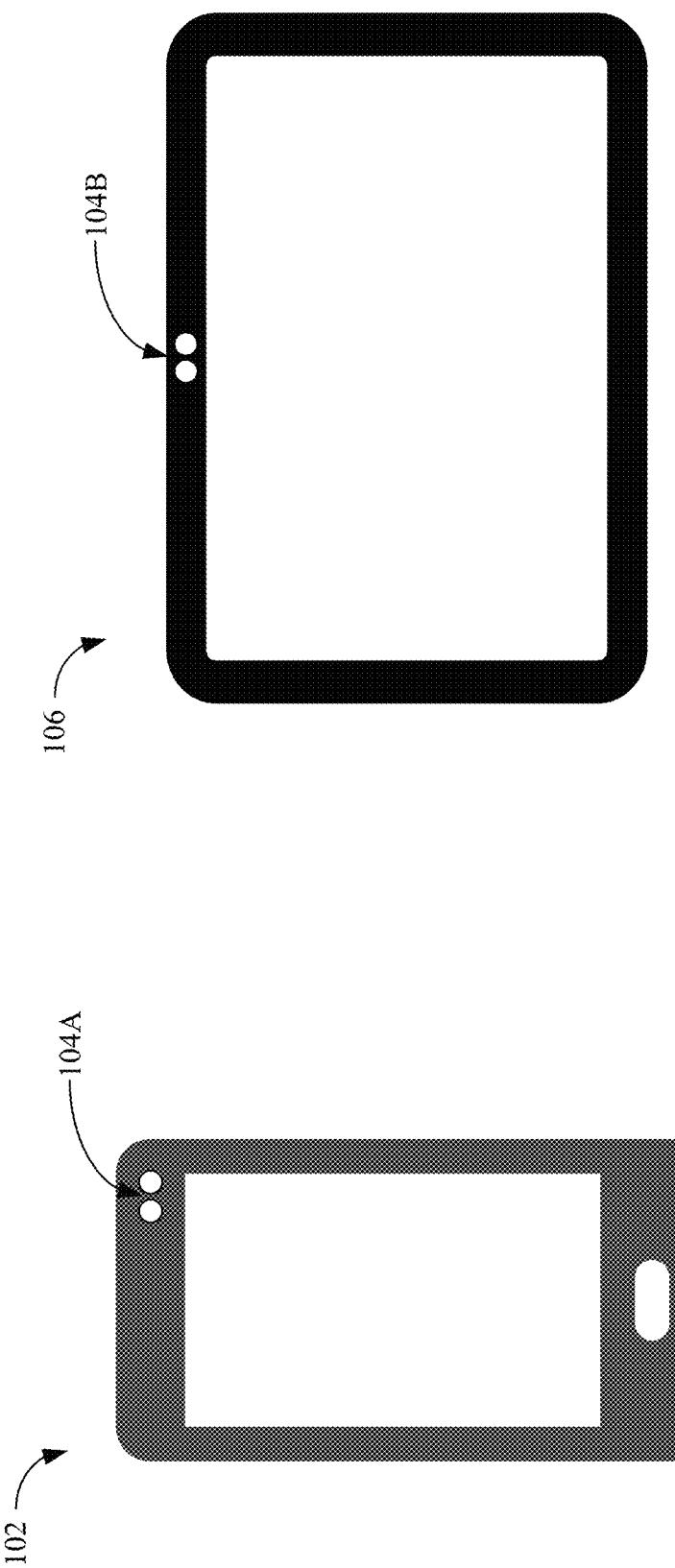

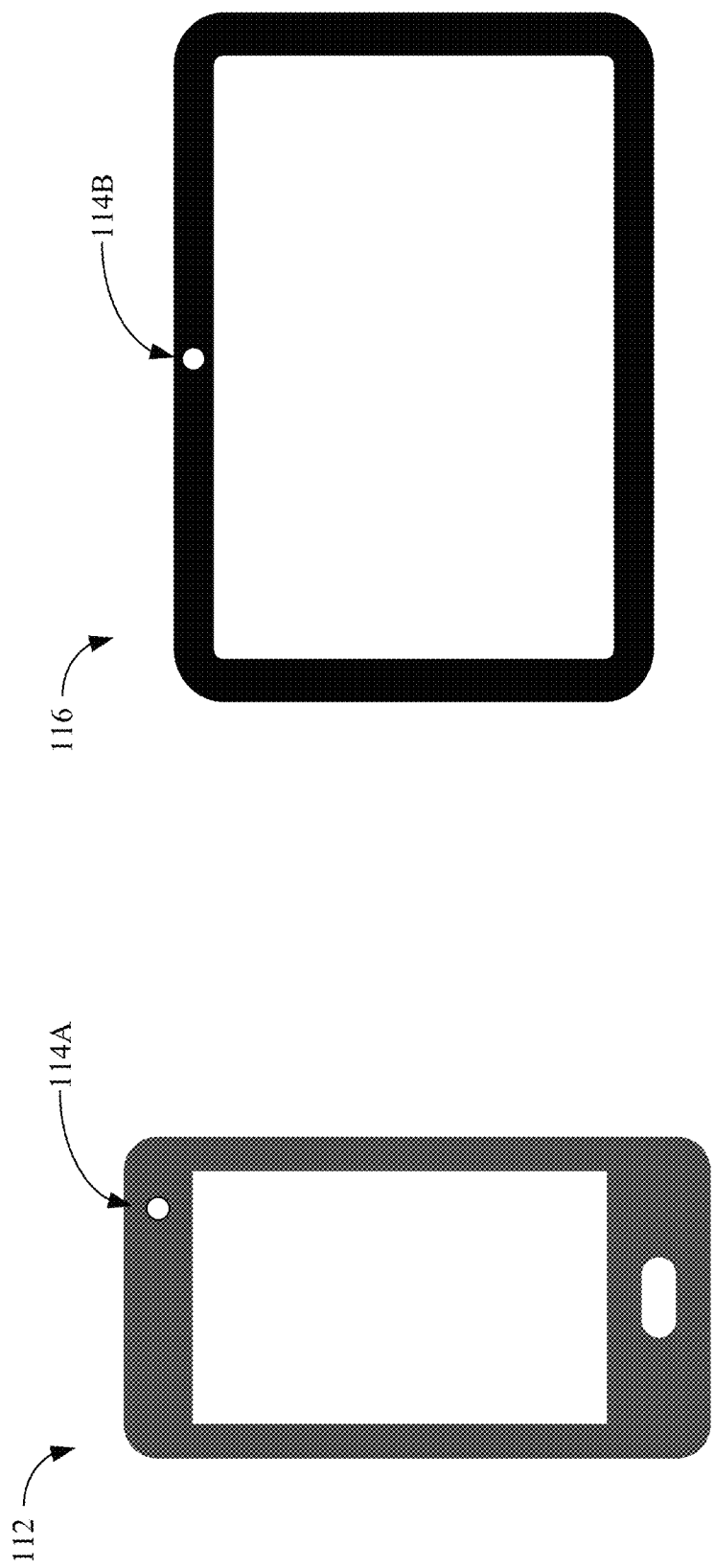

420 ⟶

```
Replace each of the fully background tiles with a corresponding one of
the replacement tiles in the output image. (422)
```
```
Replace each of the mixed tiles with a corresponding one of the
replacement mixed tiles in the output image. (424)
```
```
Insert each of the unaltered fully foreground tiles in the output image.
(426)
```

```
Replace each of the fully foreground tiles with a corresponding one of
the replacement tiles in the output image. (432)
```
```
Replace each of the mixed tiles with a corresponding one of the
replacement mixed tiles in the output image. (434)
```
```
Insert each of the unaltered fully background tiles in the output image.
(436)
```

FIG. 4C

LOW-RESOLUTION TILE PROCESSING FOR REAL-TIME BOKEH

TECHNICAL FIELD

This disclosure relates generally to image processing, and specifically to generating bokeh effects in images captured by mobile devices.

BACKGROUND

In photography, a shallow focus may be used to take a picture of a subject's face with a small depth of field (DOF) so that the camera lens focuses on the subject's face while blurring objects that lie outside of the depth of field. Blurring objects that lie outside of the depth of field (such as trees or flowers in the background portion of the scene) tends to highlight objects that lie within the depth of field (such as the subject's face), and is frequently used in portrait photography. The aesthetic quality of blurring background portions of a scene while focusing on foreground objects within the depth of field may be referred to as bokeh. Bokeh may also refer to the manner in which a camera lens renders out-of-focus points of light to create the blurring of background objects of the scene. Lens aberrations and variations in camera aperture shapes may result in some cameras blurring objects outside of the depth of field in a manner that is pleasing to the eye, and may result in other cameras blurring objects outside of the depth of field in a manner that is unpleasant or distracting.

Many mobile devices (such as smartphones, tablet computers, digital cameras, and so on) include one or more cameras for capturing images and video. The cameras provided within mobile devices may not be able to naturally generate bokeh effects in captured images, for example, because such mobile devices typically lack a camera lens capable of producing desired bokeh effects. Instead, many mobile devices may simulate bokeh effects produced by conventional camera lenses. Because simulating real-time bokeh effects in images captured by a mobile device is computationally intensive, there is a need to increase the efficiency with which mobile devices can generate real-time bokeh effects in captured images.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to methods and apparatuses for generating real-time bokeh effects in images captured, received, or stored by a mobile device. One innovative aspect of the present disclosure may be implemented as a method for generating bokeh effects in images captured, received, or stored by a mobile device. The method may include receiving an image; partitioning the image into a plurality of tiles; designating each of the plurality of tiles as one of a fully foreground tile, a fully background tile, and a mixed tile; processing either the fully background tiles or the fully foreground tiles using a tile-based filtering operation to generate a number of replacement tiles; processing the mixed tiles to generate a number of replacement mixed tiles; and generating an output image based on the replacement tiles, the replacement mixed tiles, and either unaltered fully foreground tiles or unaltered fully background tiles. In some implementations, the mixed tiles may be processed by recursively partitioning and filtering the mixed tiles until a level of granularity exists between foreground portions and background portions of the mixed tiles.

In some aspects for which bokeh effects are added to foreground portions of the image, the output image may be generated by replacing each of the fully background tiles with a corresponding one of the replacement tiles in the output image, replacing each of the mixed tiles with a corresponding one of the replacement mixed tiles in the output image, and inserting each of the unaltered fully background tiles in the output image.

In other aspects for which bokeh effects are added to foreground portions of the image, the output image may be generated by replacing each of the fully foreground tiles with a corresponding one of the replacement tiles in the output image, replacing each of the mixed tiles with a corresponding one of the replacement mixed tiles in the output image, and inserting each of the unaltered fully background tiles in the output image.

Another innovative aspect of the present disclosure may be implemented in a wireless device. The wireless device may include one or more cameras, one or more processors, and a memory storing instructions. The instructions may be executed by the one or more processors to cause the mobile device to: receive an image; partition the image into a plurality of tiles; designate each of the plurality of tiles as one of a fully foreground tile, a fully background tile, and a mixed tile; process either the fully background tiles or the fully foreground tiles using a tile-based filtering operation to generate a number of replacement tiles; process the mixed tiles to generate a number of replacement tiles; and generate an output image based on the replacement tiles, the replacement mixed tiles, and either unaltered fully foreground tiles or unaltered fully background tiles.

Another innovative aspect of the present disclosure may be implemented in a non-transitory computer-readable storage medium. The non-transitory computer-readable storage medium may store instructions that, when executed by one or more processors of a mobile device, cause the mobile device to perform a number of operations. The number of operations may include receiving an image; partitioning the image into a plurality of tiles; designating each of the plurality of tiles as one of a fully foreground tile, a fully background tile, and a mixed tile; processing either the fully background sub-tiles or the fully foreground sub-tiles using the tile-based filtering operation to generate a number of replacement sub-tiles; processing the mixed tiles to generate a number of replacement mixed tiles; and generating an output image based on the replacement tiles, the replacement mixed tiles, and either unaltered fully foreground tiles or unaltered fully background tiles.

Another innovative aspect of the present disclosure may be implemented in a wireless device. The wireless device may include means for receiving an image; means for partitioning the image into a plurality of tiles; means for designating each of the plurality of tiles as one of a fully foreground tile, a fully background tile, and a mixed tile; means for processing either the fully background tiles or the fully foreground tiles using a tile-based filtering operation to generate a number of replacement tiles; means for processing the mixed tiles to generate a number of replacement mixed tiles; and means for generating an output image based on the replacement tiles, the replacement mixed tiles, and either unaltered fully foreground tiles or unaltered fully background tiles.

BRIEF DESCRIPTION OF THE DRAWINGS

Aspects of this disclosure are illustrated by way of example, and not by way of limitation, in the figures of the accompanying drawings and in which like reference numerals refer to similar elements.

FIG. 1A shows an example device including a dual camera located on a front face of the device.

FIG. 1B shows another example device including a dual camera located on a front face of the device.

FIG. 1E shows an example device including a single camera located on a front face of the device.

FIG. 1F shows another example device including a single camera located on a front face of the device.

FIG. 4B is an illustrative flow chart depicting an example operation for generating real-time bokeh in background portions of images.

FIG. 4C is an illustrative flow chart depicting an example operation for generating real-time bokeh in foreground portions of images.

DETAILED DESCRIPTION

Figure 1D:
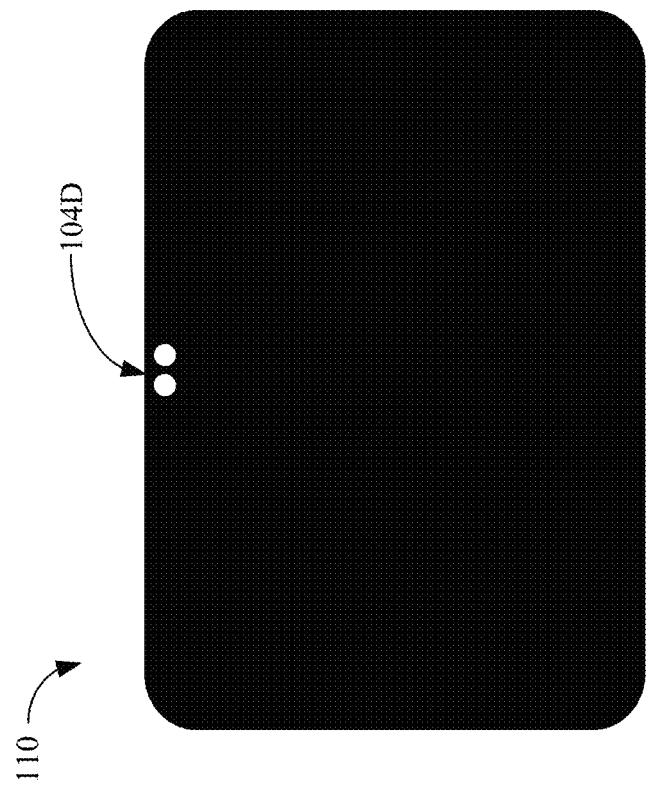
FIG. 1D shows another example device including a dual camera located on a back face of the device.

Implementations of the subject matter described in this disclosure may increase the efficiency with which a mobile device can generate bokeh effects in images captured, received, or stored in the mobile device. In accordance with aspects of the present disclosure, a mobile device may selectively use low-resolution tile-based filtering operations and recursive partitioning and filtering operations on different portions of an image to generate real-time bokeh effects. The ability to use low-resolution tile-based filtering operations for at least some portions of the image may not only reduce the computational complexity of generating bokeh effects in images but may also improve user experience, for example, by reducing the amount of time a user waits for the mobile device to add simulated bokeh effects to images.

In some implementations, the mobile device may generate a depth map for an image, and may partition the image and its corresponding depth map into a plurality of tiles. Each of the plurality of tiles may be designated as a fully foreground tile, as a fully background tile, or as a mixed tile. In some aspects, a tile may be designated as a fully foreground tile based on a determination that each pixel in the tile is a foreground pixel, and a tile may be designated as a fully background tile based on a determination that each pixel in the tile is a background pixel. In other aspects, a tile may be designated as a fully foreground tile if more than a certain proportion or percentage of its pixels can be designated as foreground pixels, and may be designated as a fully background tile if more than a certain proportion or percentage of its pixels can be designated as background pixels. A tile including both foreground pixels and background pixels may be designated as a mixed tile.

The plurality of tiles may be processed to generate an output image that includes bokeh effects (such as a blurring effect added to either background portions or foreground portions of the scene in an image). More specifically, the plurality of tiles may be selectively processed using different imaging operations based on their designations. In some implementations in which bokeh effects are added to background portions of the scene, tiles designated as fully background tiles may be processed using a low-resolution tile-based filtering operation that generates bokeh effects, tiles designated as fully foreground tiles may remain unaltered (e.g., not processed using a filtering or blurring operation), and tiles designated as mixed tiles may be processed using a recursive partitioning and filtering operation in which the tiles are iteratively partitioned into sub-tiles and processed using the low-resolution tile-based filtering operation until a level of granularity exists between the foreground and background portions of the scene appearing in the mixed tiles. In other implementations in which bokeh effects are added to foreground portions of the scene, tiles designated as fully foreground tiles may be processed using a low-resolution tile-based filtering operation that generates bokeh effects, tiles designated as fully background tiles may remain unaltered (e.g., not processed using a filtering or blurring operation), and tiles designated as mixed tiles may be processed using a recursive partitioning and filtering operation in which the tiles are iteratively partitioned into sub-tiles and processed using the low-resolution tile-based filtering operation until a level of granularity exists between the foreground and background portions of the scene appearing in the mixed tiles.

The low-resolution tile-based filtering operation may include downscaling a tile to have a lower resolution than the original tile, filtering the downscaled tile to add blurring effects (such as real-time bokeh) to either the background portions or the foreground portions of the scene appearing in the tile, and upscaling the filtered (or blurred) tile to have the same (or similar) resolution as the original tile. The resulting upscaled filtered tiles, which include generated bokeh effects, may be used to generate the output image. In some aspects, each tile designated as a fully background tile may be replaced by its corresponding upscaled blurred tile in the output image.

The recursive partitioning and filtering operation may include iteratively partitioning a tile into a plurality of sub-tiles and processing the sub-tiles using the low-resolution tile-based filtering operation to add blurring effects to either background portions or foreground portions of the scene appearing in the sub-tiles. The recursive partitioning and filtering operation may continue until a level of granularity between the foreground and background portions of the scene is achieved. For example, if the first iteration of the recursive partitioning and filtering operation does not achieve a certain level of granularity between the foreground and background portions of the scene, then a second iteration of the recursive partitioning and filtering operation may be used to partition each of the sub-tiles into a plurality of smaller sub-tiles, which are then processed using the low-resolution tile-based filtering operation to add blurring effects to either the background portions or the foreground portions of the scene appearing in the smaller sub-tiles. The resulting sub-tiles, which include generated bokeh effects, may be used to generate the output image. In some aspects, each tile designated as a mixed tile may be replaced by its corresponding processed mixed tile (which may be formed by a plurality of processed sub-tiles).

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the example implementations. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Figure 1C:
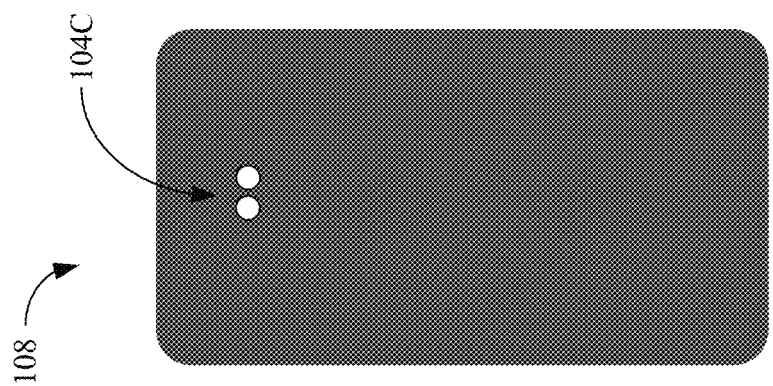
FIG. 1C shows an example device including a dual camera located on a back face of the device.

FIG. 1A shows an example device 102 (such as a smartphone) including a dual camera 104A located on a front face of the device 102. FIG. 1B shows an example device 106 (such as a tablet computer) including a dual camera 104B located on a front face of the device 106. FIG. 1C shows an example device 108 (such as a smartphone) including a dual camera 104C located on a back face of the device 108. FIG. 1D shows an example device 110 (such as a tablet computer) including a dual camera 104D located on a back face of the device 110. In some implementations, one or more of the dual cameras 104A-104D depicted in FIGS. 1A-1D, respectively, may be the same (or at least similar) dual camera. In other implementations, one or more of the dual cameras 104A-104D depicted in FIGS. 1A-1D, respectively, may be different from one another.

Figure 1H:
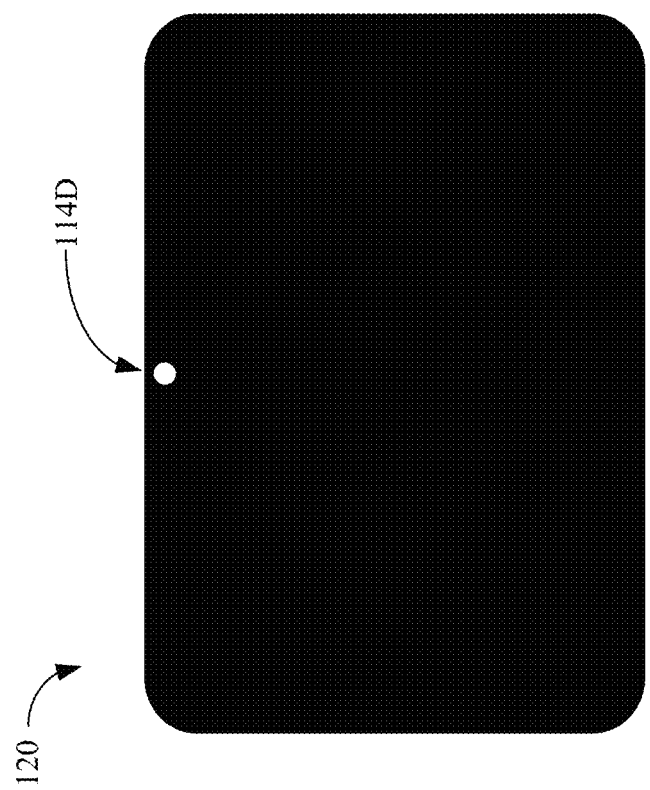
FIG. 1H shows another example device including a single camera located on a back face of the device.
Figure 1G:
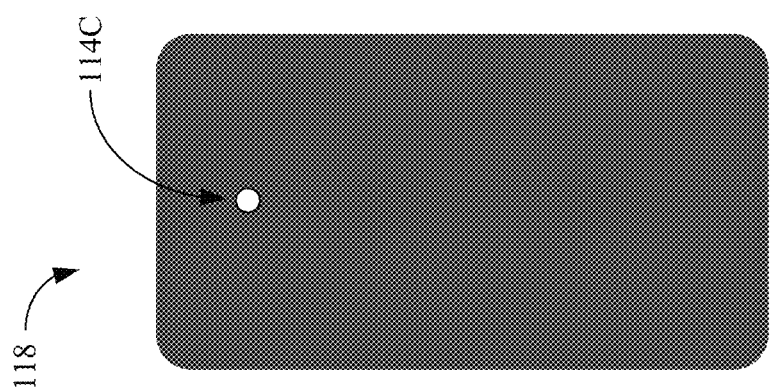
FIG. 1G shows an example device including a single camera located on a back face of the device.

FIG. 1E shows an example device 112 (such as a smartphone) including a single camera 114A located on a front face of the device 112. FIG. 1F shows an example device 116 (such as a tablet computer) including a single camera 114B located on a front face of the device 116. FIG. 1G shows an example device 118 (such as a smartphone) including a single camera 114C located on a back face of the device 118. FIG. 1H shows an example device 120 (such as a tablet computer) including a single camera 114D located on a back face of the device 120. In some implementations, one or more of the single cameras 114A-114D depicted in FIGS. 1E-1H, respectively, may be the same (or at least similar) single camera. In other implementations, one or more of the single cameras 114A-114D depicted in FIGS. 1E-1H, respectively, may be different from one another.

Figure 2:
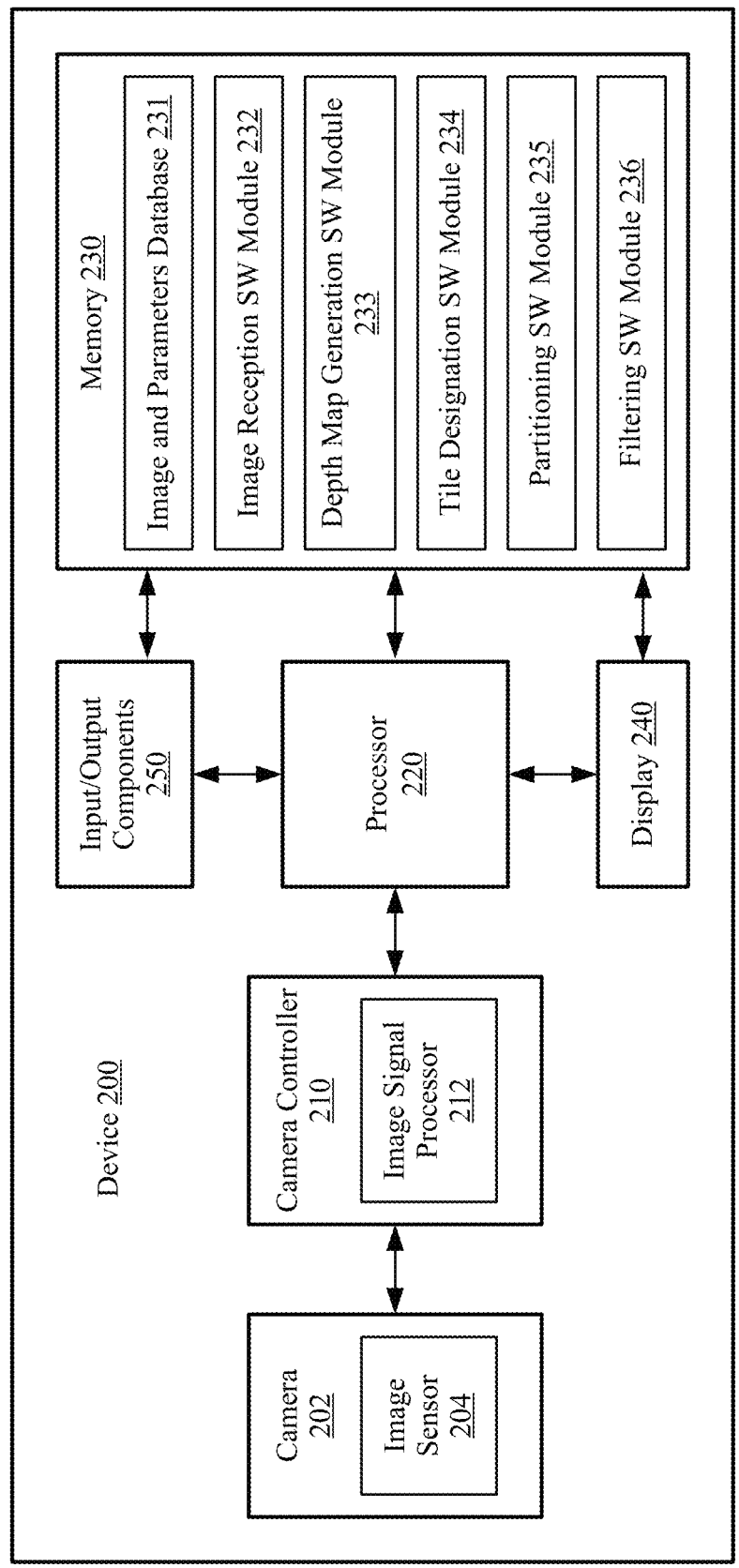
FIG. 2 is a block diagram of an example device that may be used to generate bokeh effects in captured images or video.

FIG. 2 is a block diagram of an example device 200 that may be used to generate bokeh effects in images or video. In some implementations, the device 200 may be an example of one or more of the devices 102, 106, 108, 110, 112, 116, 118 and 120 shown in respective FIGS. 1A-1H. In some aspects, the device 200 may be a mobile device such as, for example, a smartphone, tablet computer, laptop computer, personal digital assistant, or the like. In some other implementations, the device 200 may be a stationary device such as, for example, a desktop computer, security camera, or the like.

The device 200 may include a camera 202, a camera controller 210, a processor 220, and a memory 230. The camera 202, which is shown to include an image sensor 204, may be used for capturing images or video. The images or video captured by the camera 202 (such as by using the image sensor 204) may be processed by one or more components of the device 200, for example, by the camera controller 210 or the processor 220 to introduce simulated bokeh effects into the images. In some implementations, the image sensor 204 may include one or more color filter arrays (CFAs) arranged on a surface of the respective sensors. In other implementations, the image sensor 204 may include arrays of solid state sensor elements such as complementary metal-oxide semiconductor (CMOS) sensor elements. In some other implementations, the image sensor 204 may include other suitable types of image sensors for capturing images.

Although the example device 200 is shown in FIG. 2 as including only one camera 202, in other implementations, the example device 200 may include any suitable number of cameras that may be arranged in any suitable configuration. For implementations in which the device 200 includes multiple cameras, the multiple cameras may have similar or different capabilities (such as resolution, color or black and white, a wide view lens versus a telephoto lens, zoom capabilities, and so on), and may be positioned on any suitable face (such as the front face or the back face) of the device 200.

The camera controller 210, which may control operation of the camera 202 and the image sensor 204, is shown to include an image signal processor 212 that may process captured images or video provided by the camera 202. In some implementations, the image signal processor 212 may execute instructions from a memory (such as instructions stored in the memory 230 or instructions stored in a separate memory coupled to the image signal processor 212) to control operation of the camera 202, and/or may execute instructions from a memory (such as instructions stored in the memory 230 or instructions stored in a separate memory coupled to the image signal processor 212) to process one or more images or video provided by the camera (such as by generating real-time bokeh effects in the images). The processed images or video may be stored in a memory (such as the memory 230), may be presented to a user for viewing (such as by using the display 240), or both. Images captured by the camera or received by the device 200 may be presented as a preview to the user (such as by using the display 240). In some other implementations, the image signal processor 212 may include specific hardware to control operation of the camera 202 and/or to process one or more images or video (such as by generating real-time bokeh effects in images captured by, received by, or stored in the device 200). The image signal processor 212 may alternatively or additionally include a combination of specific hardware and the ability to execute software instructions. Further, although not shown in FIG. 2 for simplicity, the image signal processor 212 may include one or more image processing cores (such as a video encoding core), one or more image compression cores, or both.

The device 200 may also include a display 240 and any number of input/output (I/O) components 250. The display 240 may be any suitable display or screen allowing for user interaction and/or to present items (such as captured images, video, or a preview image) for viewing by the user. In some aspects, the display 240 may be a touch-sensitive display. The I/O components 250 may be or include any suitable mechanism, interface, or device to receive input (such as commands) from the user and to provide output to the user. For example, the I/O components 250 may include (but are not limited to) a graphical user interface, keyboard, mouse, microphone and speakers, and so on. In some implementations, the display 240 and/or the I/O components 250 may receive user input for selecting or adjusting one or more settings of the camera controller 210 and/or for selecting or adjusting one or more settings of the camera 202.

The device 200 may include additional features or components not shown in FIG. 2 for simplicity. For example, a wireless interface, which may include one or more transceivers and baseband processors, may be included for a wireless communication device. Additionally, the device 200 may include or be coupled to additional cameras other than the camera 202. The disclosure should not be limited to any specific examples or illustrations, including the example device 200.

The memory 230 may include an image and parameters database 231 to store images or video captured by the camera 202 and/or images or video provided by another device. The image and parameters database 231 may also store any number of parameters for use in processing images or video. In some aspects, the image and parameters database 231 may store a number of parameters used to generate real-time bokeh effects in images. The stored parameters may include one or more threshold values that may be used to designate each tile of an image as a fully foreground tile, as a fully background tile, or as a mixed tile. The stored parameters may also include one or more scaling factors for use in downscaling and upscaling an image, for use in downscaling and upscaling a plurality of tiles of the image, and for use in downscaling and upscaling a plurality of sub-tiles within a respective one of the plurality of tiles. The stored parameters may also include one or more one or more filter coefficients to implement a blurring filter that generates bokeh effects in images.

The memory 230 may include a non-transitory computer-readable medium (e.g., one or more nonvolatile memory elements, such as EPROM, EEPROM, Flash memory, a hard drive, and so on) that may store at least the following software (SW) modules:

- an image reception SW module 232 to capture and receive images using the camera 202 or to receive images provided by another device (e.g., as described for one or more operations of FIGS. 4A-4C, 5, and 6);
- a depth map generation SW module 233 to generate depth maps corresponding to images captured by the camera 202 (or provided by another device) (e.g., as described for one or more operations of FIGS. 4A-4C, 5, and 6);
- a tile designation SW module 234 to designate tiles of a partitioned image as a fully foreground tile, as a fully background tile, or as a mixed tile based at least in part on the corresponding depth map, and to designate sub-tiles of a partitioned tile as a fully foreground tile, as a fully background tile, or as a mixed tile based at least in part on the corresponding depth map (e.g., as described for one or more operations of FIGS. 4A-4C, 5, and 6);
- a partitioning SW module 235 to partition an image or a corresponding depth map into a number of tiles, and to recursively partition a tile into a number of smaller sub-tiles for filtering until a level of granularity exists between the foreground and background portions of a scene associated with the image (e.g., as described for one or more operations of FIGS. 4A-4C, 5, and 6); and
- a filtering SW module 236 to generate blurring effects in either background portions or foreground portions of images (e.g., as described for one or more operations of FIGS. 4A-4C, 5, and 6).

Each software module includes instructions that, when executed by the processor 220, cause the device 200 to perform the corresponding functions. The non-transitory computer-readable medium of the memory 230 thus includes instructions for performing all or a portion of the operations described with respect to FIGS. 4A-4C, 5, and 6.

The processor 220 may be any suitable one or more processors capable of executing scripts or instructions of one or more software programs stored in the device 200 (e.g., within the memory 230). In some implementations, the processor 220 may include or form one or more stages of an image processing pipeline. The processor 220 may execute the image reception SW module 232 to capture or receive images using the camera 202 or to receive images provided by another device. The processor 220 may execute the depth map generation SW module 233 to generate depth maps corresponding to images captured or provided by the camera 202 (or to images provided by another device or stored within the device 200). The processor 220 may execute the tile designation SW module 234 to designate tiles of a partitioned image as a fully foreground tile, a fully background tile, or a mixed tile based at least in part on the corresponding depth map, and to designate sub-tiles of a partitioned tile as a fully foreground tile, as a fully background tile, or as a mixed tile based at least in part on the corresponding depth map.

The processor 220 may execute the partitioning SW module 235 to partition an image or a corresponding depth map into a number of tiles, and to recursively partition a tile into a number of smaller sub-tiles for filtering until a level of granularity exists between the foreground and background portions of a scene associated with the image. The processor 220 may execute the filtering SW module 236 to generate blurring effects in either background portions or foreground portions of images. In some aspects, execution of the filtering SW module 236 may be used to generate blurring effects in background portions of the tiles of a partitioned image, and may be used to generate blurring effects in background portions of the sub-tiles of a partitioned tile. In other aspects, execution of the filtering SW module 236 may be used to generate blurring effects in foreground portions of the tiles of a partitioned image, and may be used to generate blurring effects in foreground portions of the sub-tiles of a partitioned tile.

The term "device" is not limited to one or a specific number of physical objects (such as one smartphone). As used herein, a device may be any electronic device with multiple parts that may implement at least some portions of this disclosure. While the below description and examples use the term "device" to describe various aspects of this disclosure, the term "device" is not limited to a specific configuration, type, or number of objects.

As described above, many mobile devices include one or more cameras for a variety of image capture and processing applications. Because cameras provided in mobile devices (such as smartphones and tablet computers) may not be capable of naturally producing bokeh effects in captured or received images, mobile devices may instead simulate bokeh effects in captured or received images. Generating real-time bokeh effects in captured or received images is computationally intensive, and therefore it is desirable to increase the efficiency with which mobile devices can generate real-time bokeh effects in images captured or received by the mobile device, for example, to reduce the amount of time and the amount of resources associated with generating bokeh effects in the images.

In accordance with aspects of the present disclosure, a mobile device may generate real-time bokeh effects in images in a more efficient manner than conventional techniques by using a selective combination of recursive partitioning and filtering operations and low-resolution tile-based filtering operations to generate real-time bokeh effects in the images. More specifically, the selective use of recursive partitioning and filtering operations and low-resolution tile-based filtering operations to generate bokeh effects in images may not only reduce the computational complexity of generating bokeh effects in images but also may increase the speed with which the mobile device can generate bokeh effects in the images. Increasing the speed with which real-time bokeh effects can be generated (or simulated) may improve user experience, for example, by reducing the amount of time the user waits for the mobile device to insert bokeh effects into either background portions or foreground portions of scenes captured in the image.

In some implementations, the mobile device may capture or receive an image, and may generate a depth map for the image. The mobile device may partition the image and the depth map into a plurality of tiles. The depth map may be used to designate different portions of the image as corresponding to a foreground portion of a scene, to a background portion of the scene, or to a "mixed" portion of the scene which includes both foreground portions and background portions. More specifically, the depth may be used to designate each of the plurality of tiles as a fully foreground tile, as a fully background tile, or as a mixed tile. The tiles may be selectively processed using different operations based at least in part on their designations to generate or insert bokeh effects in either the background portions or the foreground portions of the image.

In some implementations, tiles designated as fully background tiles may be processed using a low-resolution tile-based filtering operation in which the tiles are downscaled to a resolution lower than the resolution of the image, filtered to add blurring effects (such as real-time bokeh) to background portions of the scene, and then upscaled to the original resolution of the image. The resulting processed tiles may be used to generate an output image containing simulated bokeh effects in background portions of the scene. In other implementations, tiles designated as fully foreground tiles may be processed using a low-resolution tile-based filtering operation in which the tiles are downscaled to a resolution lower than the resolution of the image, filtered to add blurring effects (such as real-time bokeh) to foreground portions of the scene, and then upscaled to the original resolution of the image. The resulting processed tiles may be used to generate an output image containing simulated bokeh effects in foreground portions of the scene.

Tiles designated as mixed tiles may be recursively partitioned into smaller sub-tiles and then processed according to their designations as fully foreground sub-tiles, as fully background sub-tiles, or as mixed sub-tiles. In some implementations, the sub-tiles may be processed in a manner similar to that used to process the tiles of a partitioned image. For example, when simulating bokeh effects in the background portions of an image, sub-tiles designated as fully foreground sub-tiles may remain unaltered (e.g., not processed using a filtering or blurring operation), sub-tiles designated as fully background sub-tiles may be processed using the low-resolution tile-based filtering operation, and sub-tiles designated as mixed sub-tiles may be partitioned into even smaller sub-tiles. In some aspects, sub-tiles designated as mixed sub-tiles may be iteratively partitioned (such as into smaller and smaller sub-tiles) and filtered until a level of granularity exists between the foreground portions and the background portions of the captured scene (at which point the iterative partitioning of sub-tiles may stop). Tiles designated as fully foreground tiles may not be processed, for example, because it may not be desirable to add blurring effects to foreground portions of the scene. Thus, in some implementations, tiles designated as fully foreground tiles may be used in their original or unaltered form to generate the output image. As used herein, tiles that are used in their original or unaltered form to generate the output image are not partitioned, downscaled, filtered, or blurred to generate bokeh effects therein. Thus, although these tiles may be subject to some processing (such as by the camera controller 210 and/or the processor 220 of FIG. 2), these tiles are not processed or filtered to generate bokeh or other blurring effects.

In other implementations, the fully foreground tiles may be processed to add simulated bokeh effects, for example, so that blurring effects are added to foreground portions of the scene. For these other implementations, tiles designated as fully foreground tiles may be processed using a low-resolution tile-based filtering operation in which the tiles are downscaled to a resolution lower than the resolution of the image, filtered to add blurring effects (such as real-time bokeh) to foreground portions of the scene, and then upscaled to the original resolution of the image. The resulting processed tiles may be used to generate an output image containing simulated bokeh effects in foreground portions of the scene.

Tiles designated as mixed tiles may be recursively partitioned into smaller sub-tiles and then processed according to their designations as fully foreground sub-tiles, as fully background sub-tiles, or as mixed sub-tiles. In some implementations, the sub-tiles may be processed in a manner similar to that used to process the tiles of a partitioned image. For example, sub-tiles designated as fully background sub-tiles may remain unaltered (e.g., not processed using a filtering or blurring operation), sub-tiles designated as fully foreground sub-tiles may be processed using the low-resolution tile-based filtering operation, and sub-tiles designated as mixed sub-tiles may be iteratively partitioned (such as into smaller and smaller sub-tiles) and filtered until a level of granularity exists between the foreground portions and the background portions of the captured scene.

In some other implementations, a user may select whether bokeh effects are added to the background portions of a scene or to the foreground portions of the scene. For example, referring also to FIG. 2, the device 200 may be configured to receive user input (such as via the I/O components 250) selecting either a first mode in which bokeh effects are added to the background portions of the scene or a second mode in which bokeh effects are added to the foreground portions of the scene. In some aspects, the I/O components 250 may generate a signal based on the user input, and may provide the signal to the processor 220 (or to the camera controller 210). The signal, which may be referred to as a mode signal, a select signal, or the like, may indicate whether the processor 220 is to add bokeh effects to the foreground portions of the scene or to the background portions of the scene (or to both).

In some implementations, a tile may be designated as a fully foreground tile based on a determination that each pixel in the tile is a foreground pixel, and a tile may be designated as a fully background tile based on a determination that each pixel in the tile is a background pixel. In other implementations, a tile may be designated as a fully foreground tile if more than a certain proportion or percentage of its pixels can be designated as foreground pixels, and may be designated as a fully background tile if more than a certain proportion or percentage of its pixels can be designated as background pixels. A tile including both foreground pixels and background pixels may be designated as a mixed tile. In some aspects, sub-tiles may be designated as either fully foreground sub-tiles, fully background sub-tile, or as mixed sub-tiles in a similar manner.

Each of the pixels in a tile or sub-tile may be designated as either a "foreground pixel" or as a "background pixel." A foreground pixel may be defined as a pixel having a luminance indicating a proximity less than a threshold distance from the camera, and a background pixel may be defined as a pixel having a luminance indicating a proximity greater than (or equal to) the threshold distance from the camera.

Figure 3B:
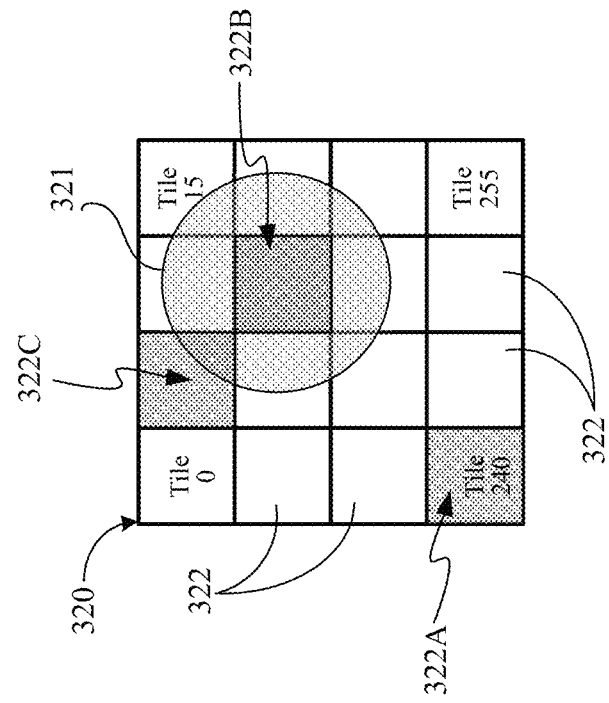
FIG. 3B shows an example depth map of the image of FIG. 3A.
Figure 3A:
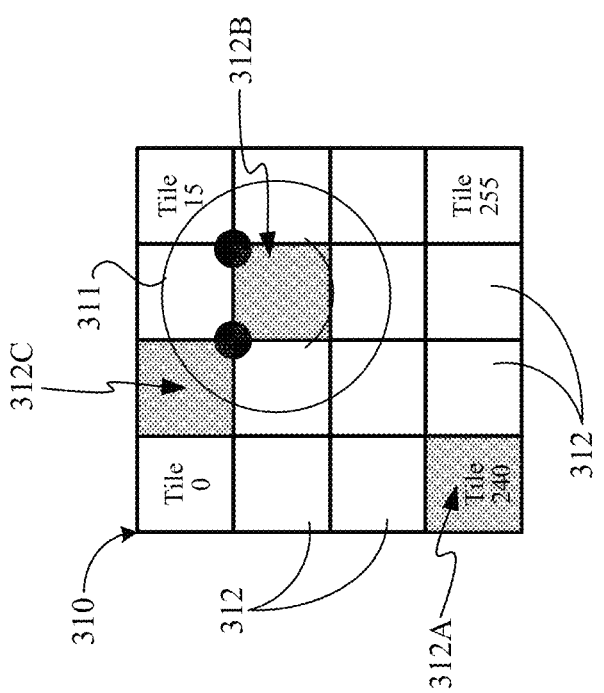
FIG. 3A shows an example image.

FIG. 3A shows an example image 310 including a foreground object 311, and FIG. 3B shows an example depth map 320 corresponding to the image 310 of FIG. 3A. The depth map 320 is shown to include a foreground portion 321 that corresponds to the foreground object 311 of the image 310. For purposes of discussion herein, the image 310 of FIG. 3A may be captured by the mobile device 200 of FIG. 2, may have a resolution of 4096×4096 pixels, and may be partitioned into 256 tiles (e.g., tiles 312) arranged in a 16×16 grid (for simplicity only 16 of the tiles 312 of the image 310 are shown in FIG. 3A). In some aspects, each of the tiles 312 may have a resolution of 256×256 pixels. The example depth map 320 of FIG. 3B is also partitioned into 256 tiles (e.g., tiles 322) arranged in a 16×16 grid (for simplicity only 16 of the tiles 322 of the depth map 320 are shown in FIG. 3B). In some other implementations, the image 310 may be partitioned into other suitable numbers of tiles 312, and the depth map 320 may be partitioned into other suitable numbers of tiles 322.

In some implementations, each of the tiles 322 of the depth map 320 corresponds to an associated one of the tiles 312 of the image 310. For example, tile 322A of the depth map 320 may correspond to tile 312A of the image 310, tile 322B of the depth map 320 may correspond to tile 312B of the image 310, and tile 322C of the depth map 320 may correspond to tile 312C of the image 310. In some aspects, the tiles 312 of the image 310 and the corresponding tiles 322 of the depth map 320 may be referenced by an index value (x, y), where the value of x indicates a horizontal position of the tile and the value of y indicates a vertical position of the tile. For example, the tile 312A is positioned in the first column of the last row, and thus may be referenced by an index value of (15, 0).

Each of the tiles 322 of the depth map 320 may be designated as either a fully foreground tile, as a fully background tile, or as a mixed tile. For example, tile 322A lies entirely outside of the foreground portion 321 of the depth map 320, and may therefore be designated as a fully background tile. Tile 322B lies entirely within the foreground portion 321 of the depth map 320, and may therefore be designated as a fully foreground tile. Tile 322C lies partially within the foreground portion 321 of the depth map 320 and partially outside the foreground portion 321 of the depth map 320, and may therefore be designated as a mixed tile. The tile designations determined using the depth map 320 may be used to designate corresponding tiles 312 of the image 310. For example, tile 312A of the image 310 corresponds to tile 322A of the depth map 320, and thus the tile 312A may be designated as a fully background tile. Similarly, tile 312B of the image 310 corresponds to tile 322B of the depth map 320, and thus the tile 312B may be designated as a fully foreground tile. Also, tile 312C of the image 310 corresponds to tile 322C of the depth map 320, and thus the tile 312C may be designated as a mixed tile.

In some implementations, the fully background tiles of an image may be processed using a low-resolution tile-based filtering operation that downscales, filters, and then upscales the fully background tiles to generate an output image containing simulated bokeh effects. The mixed tiles of the image may be processed using a recursive partitioning and filtering operation that partitions each of the mixed tiles into a plurality of sub-tiles, and then downscales, filters, and upscales each of the plurality of sub-tiles to generate a corresponding number of processed mixed sub-tiles containing bokeh effects generated by the filters (e.g., such that bokeh effects are added to the background portions of the mixed sub-tiles). The processed mixed sub-tiles may be used to generate the output image. The fully foreground tiles of the image may be used in their original or unaltered form to generate the output image. In this manner, aspects of the present disclosure may be used to add bokeh effects to background portions of the image.

In some other implementations, the fully foreground tiles of an image may be processed using a low-resolution tile-based filtering operation that downscales, filters, and then upscales the fully foreground tiles to generate an output image containing simulated bokeh effects. The mixed tiles of the image may be processed using a recursive partitioning and filtering operation that partitions each of the mixed tiles into a plurality of sub-tiles, and then downscales, filters, and upscales each of the plurality of sub-tiles to generate a corresponding number of processed mixed sub-tiles containing bokeh effects generated by the filters (e.g., such that bokeh effects are added to the foreground portions of the mixed sub-tiles). The processed mixed sub-tiles may be used to generate the output image. The fully background tiles of the image may be used in their original or unaltered form to generate the output image. In this manner, aspects of the present disclosure may be used to add bokeh effects to foreground portions of the image.

Figure 3C:
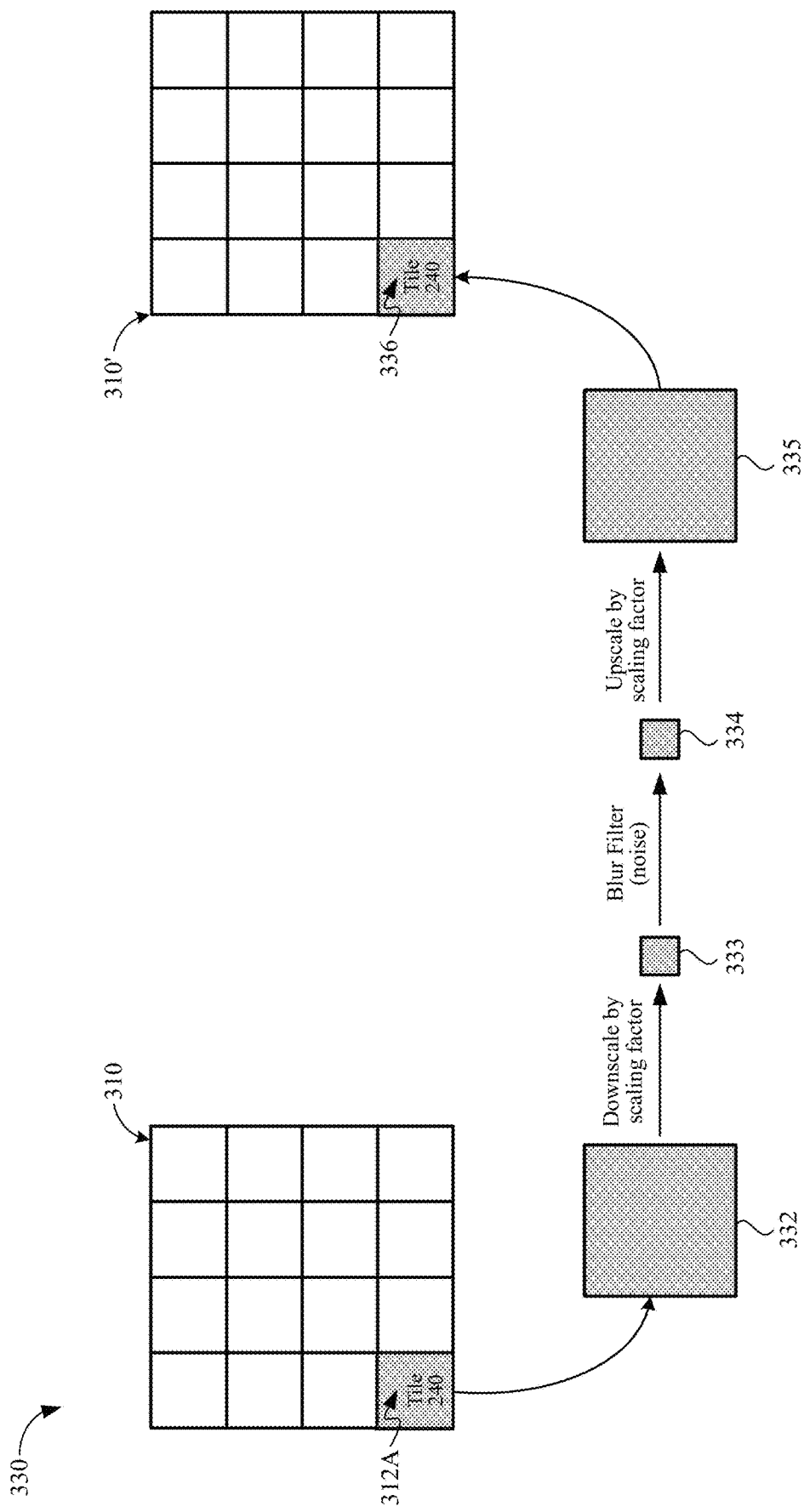
FIG. 3C depicts an example low-resolution tile-based filtering operation for adding blurring effects to a fully background tile of an image.

FIG. 3C depicts an example low-resolution tile-based filtering operation 330 for adding blurring effects to the tile 312A of the image 310 of FIG. 3A. The tile 312A is designated as a fully background tile 332, and may be downscaled to generate a downscaled tile 333. In some implementations, the mobile device 200 may use a scaling factor (N) when downscaling the fully background tile 332 so that the downscaled tile 333 has a resolution that is equal to 1/N times the resolution of the original tile 312A of the image 310.

Blurring effects (such as simulated bokeh effects) may be added to the downscaled tile 333 using a suitable blurring filter, for example, to generate a blurred tile 334. The blurring filter may be any suitable filter or may implement any suitable blurring function (such as defocus blur or a Gaussian blur) to generate bokeh effects in the fully background tile 332. In some aspects, the blurred tile 334 may have the same resolution as the downscaled tile 333, which as discussed above may be N times lower than the resolution of the fully background tile 332.

The blurred tile 334 may be upscaled to generate an upscaled blurred tile 335 having a resolution that is greater than the resolution of the downscaled tile 333 and the blurred tile 334. In some aspects, the upscaled blurred tile 335 may have the same resolution as the fully background tile 332, for example, so that the upscaled blurred tile 335 may be used as a replacement background tile 336 for the fully background tile 312A to generate the output image 310' (such that a resolution of the replacement background tile 336 is the same as the resolution of the fully background tile 312A, and a resolution of the output image 310' is the same as the resolution of the original image 310).

Because the downscaled tile 333 has a resolution that is a fraction (such as 1/N) of the resolution of the original fully background tile 312A, the mobile device 200 may add blurring effects to background portions of the downscaled tile 333 in less time and using fewer resources than to the original fully background tile 312A, thereby increasing the speed with which the mobile device 200 can add simulated bokeh effects to background portions of images.

In some implementations, the original tile 312A of the image 310 may have a resolution of 256×256 pixels, and the mobile device 200 may use a scaling factor N=4 for the downscaling and upscaling operations. Downscaling the 256×256 pixel fully background tile 332 using a scaling factor N=4 may result in the downscaled tile having a resolution of 64×64 pixels, and upscaling the blurred tile 334 using a scaling factor N=4 may result in the upscaled tile 335 having a resolution of 256×256 pixels (which is the same as the original fully background tile 312A). It is to be understood that the original tile 312A may have other suitable resolutions, and the mobile device 200 may select other suitable values for the scaling factor.

Figure 3D:
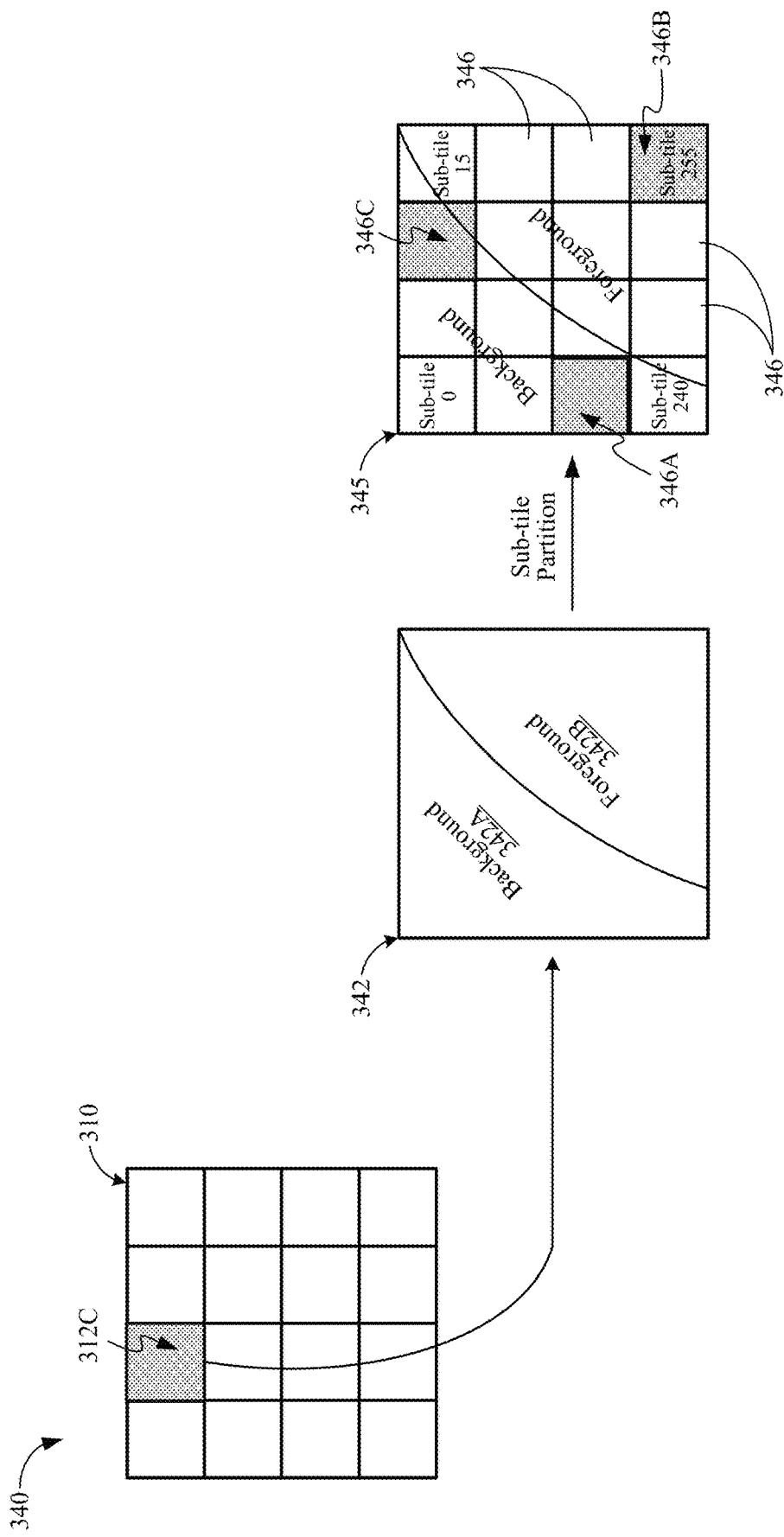
FIG. 3D depicts an example operation for partitioning a mixed tile of an image.

FIG. 3D depicts an example partitioning operation 340 for processing the tile 312C of the image 310 of FIG. 3A. The tile 312C is designated as a mixed tile 342, and may include a background portion 342A and a foreground portion 342B. The mixed tile 342 may be partitioned to form a partitioned tile 345 including a plurality of sub-tiles 346. Each of the sub-tiles 346 may be designated either as a fully foreground sub-tile, as a fully background sub-tile, or as a mixed sub-tile. Thus, as shown in the example of FIG. 3D, the partitioned tile 345 may include a number of fully background sub-tiles (such as the fully background sub-tile 346A), may include a number of a fully foreground sub-tiles (such as the fully foreground sub-tile 346B), and may include a number of a mixed sub-tiles (such as the mixed sub-tile 346C). It is noted that the fully background sub-tile 346A lies entirely within the background portion of the scene, the fully foreground sub-tile 346B lies entirely within the foreground portion of the scene, and the mixed sub-tile 346C lies partially within the foreground portion and partially within the background portion. In some aspects, each of the sub-tiles 346 may be designated as a fully foreground sub-tile, a fully background sub-tile, or a mixed sub-tile in a manner similar to the designation of each of the tiles 312 of the image 310 of FIG. 3A.

In some implementations, the designation of a given one of the sub-tiles 346 as a fully foreground sub-tile, a fully background sub-tile, or a mixed sub-tile may be based on an analysis of the pixels of a corresponding sub-tile of the depth map associated with the image. For example, if all of the pixels of the corresponding sub-tile of the depth map are background pixels, then the given sub-tile 346 of the image may be designated as a fully background sub-tile. Conversely, if all of the pixels of the corresponding sub-tile of the depth map are foreground pixels, then the given sub-tile 346 of the image may be designated as a fully foreground sub-tile. In some implementations, if the number (or percentage) of foreground pixels of the corresponding sub-tile of the depth map is less than or equal to a first threshold value, then the given sub-tile 346 of the image may be designated as a mixed sub-tile. Conversely, if the number (or percentage) of foreground pixels of the corresponding sub-tile of the depth map is greater than the first threshold value, then the given sub-tile 346 of the image may be designated as a fully foreground sub-tile. Similarly, if the number (or percentage) of background pixels of the corresponding sub-tile of the depth map is less than or equal to a second threshold value, then the given sub-tile 346 of the image may be designated as a mixed sub-tile. Conversely, if the number (or percentage) of background pixels of the corresponding sub-tile of the depth map is greater than the second threshold value, then the given sub-tile 346 of the image may be designated as a fully background sub-tile.

Figure 3E:
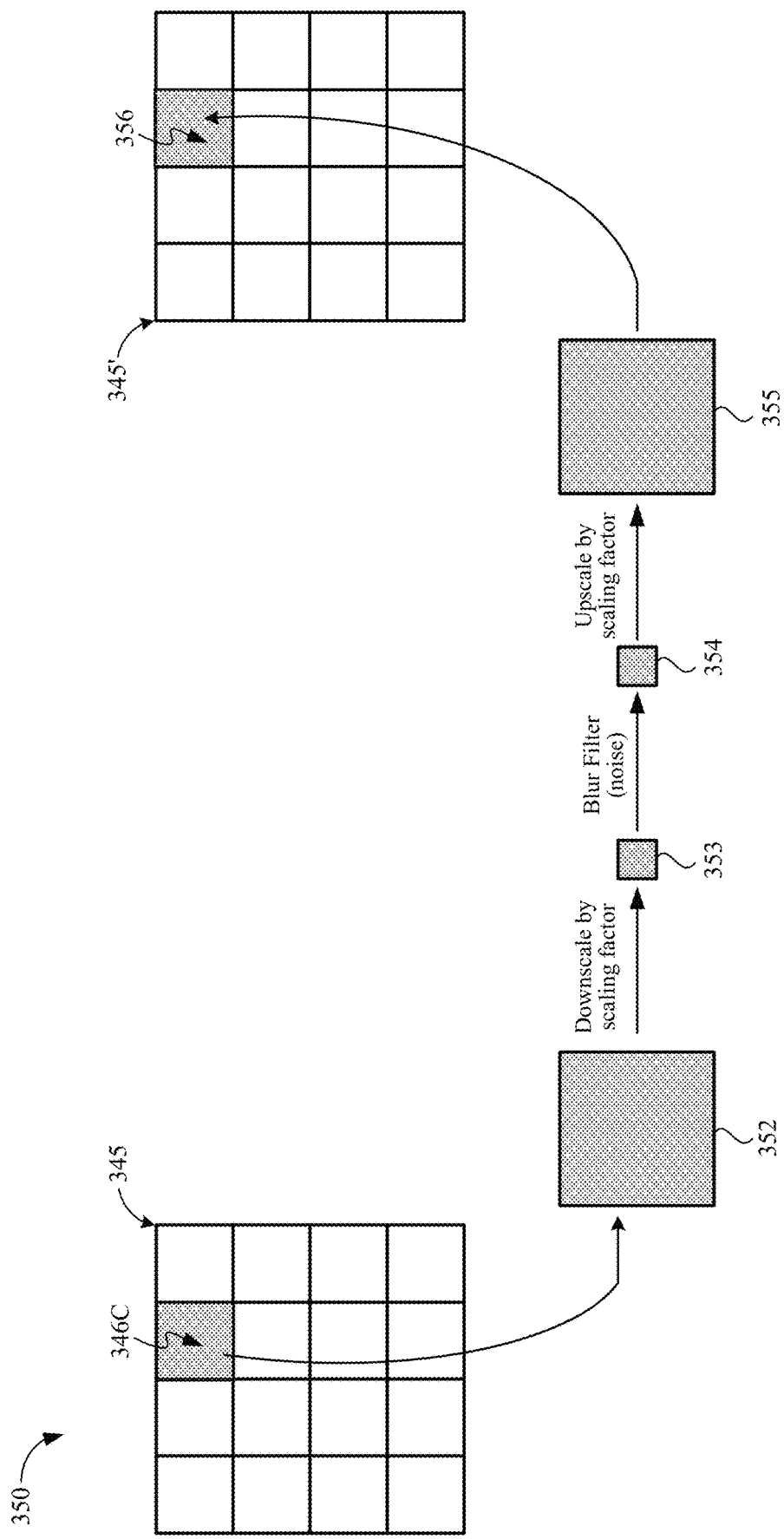
FIG. 3E depicts an example low-resolution tile-based filtering operation for adding blurring effects to a fully background sub-tile of a partitioned tile.

In some implementations, the fully background sub-tiles of the partitioned mixed tile 345 may be filtered to add blurring effects in a manner similar to the operation 330 described with respect to FIG. 3C. For example, FIG. 3E depicts an example low-resolution tile-based filtering operation 350 for adding blurring effects to background portions of the sub-tile 346C of the partitioned tile 345 of FIG. 3D. The sub-tile 346C is designated as a fully background sub-tile 352, and may be downscaled to generate a downscaled sub-tile 353. In some implementations, the mobile device 200 may use the scaling factor N when downscaling the fully background sub-tile 352 so that the downscaled sub-tile 353 has a resolution that is equal to 1/N times the resolution of the original sub-tile 346C of the partitioned tile 345.

Blurring effects (such as simulated bokeh effects) may be added to the downscaled sub-tile 353 using a suitable blurring filter, for example, to generate a blurred sub-tile 354. The blurring filter may be any suitable filter or may implement any suitable blurring function (such as defocus blur or a Gaussian blur) to generate bokeh effects in the fully background sub-tile 352. In some aspects, the blurred sub-tile 354 may have the same resolution as the downscaled sub-tile 353, which as discussed above may be N times lower than the resolution of the fully background sub-tile 352.

The blurred sub-tile 354 may be upscaled to generate an upscaled blurred sub-tile 355 having a resolution that is greater than the resolution of the downscaled sub-tile 353 and the blurred sub-tile 354. In some aspects, the upscaled blurred sub-tile 355 may have the same resolution as the fully background sub-tile 352, for example, so that the upscaled blurred sub-tile 355 may be used as a replacement background sub-tile 356 for the fully background sub-tile 346C to generate an output partitioned tile 345' (such that a resolution of the replacement background sub-tile 356 is the same as the resolution of the fully background sub-tile 346C, and a resolution of the output partitioned tile 345' is the same as the resolution of the partitioned tile 345).

Because the downscaled sub-tile 353 has a resolution that is a fraction (such as 1/N) of the resolution of the original sub-tile 346C, the mobile device 200 may add blurring effects to background portions of the downscaled sub-tile 353 in less time and using fewer resources than to the original sub-tile 346C, thereby increasing the speed with which the mobile device 200 can add simulated bokeh effects to background portions of images.

In some implementations, the original sub-tile 346C of the partitioned tile 345 may have a resolution of 256×256 pixels, and the mobile device 200 may use a scaling factor N=4 for the downscaling and upscaling operations. Downscaling the 256×256 pixel fully background sub-tile 352 using a scaling factor N=4 may result in the downscaled sub-tile 353 having a resolution of 64×64 pixels, and upscaling the blurred sub-tile 354 using a scaling factor N=4 may result in the upscaled sub-tile 355 having a resolution of 256×256 pixels (which is the same as the original sub-tile 346C). It is to be understood that the original sub-tile 346C may have other suitable resolutions, and the mobile device 200 may select other suitable values for the scaling factor. Further, although the example operation 330 of FIG. 3C and the example operation 350 of FIG. 3E are described herein as having the same scaling factor N, in other implementations, the mobile device 200 may use different scaling factors for example operations 330 and 350 (such as by using a first scaling factor for the operation 330 and using a second scaling factor for the operation 350).

In some aspects, the mobile device 200 may use the same scaling factor for downscaling fully background tiles and for downscaling fully background sub-tiles. In other aspects, the mobile device 200 may use different scaling factors for downscaling fully background tiles and for downscaling fully background sub-tiles.

In addition, or in the alternative, commonalities may exist between the resolution of an image and the resolutions of the tiles and sub-tiles generated using the low-resolution tile-based filtering operation of FIG. 3C, the partitioning operation 340 of FIG. 3D, and/or the low-resolution tile-based filtering operation of FIG. 3E. In some implementations, a first ratio between the resolution of the image 310 of FIG. 3A and the resolution of each of the tiles 322 in the corresponding depth map 320 of FIG. 3B may be equal to a second ratio between the resolution of the tile 322 and the resolution of each of the sub-tiles 346 in the corresponding partitioned tile 345. In some aspects, the first and second ratios may be an integer power of two (such as $2^3=8$, $2^4=16$, and so on). For example, the image 310 may have a resolution of 4096×4096 pixels, each of the tiles 312 may have a resolution of 256×256 pixels, and each of the sub-tiles 346 may have a resolution of 16×16 pixels. Note that while this example includes an image, tiles, and sub-tiles which are square, in other implementations the image, tiles, and sub-tiles may be rectangular rather than square.

As mentioned above, in other implementations, bokeh effects may be added to foreground portions of an image or scene. The operations described above with respect to FIGS. 3A-3E may be used in a similar manner to add simulated bokeh effects to the foreground portions of the image or scene, for example, except that tiles designated as fully foreground tiles may be processed using a low-resolution tile-based filtering operation in which the tiles are downscaled to a resolution lower than the resolution of the image, filtered to add blurring effects (such as real-time bokeh) to foreground portions of the scene, and then upscaled to the original resolution of the image. The resulting processed tiles may be used to generate an output image containing simulated bokeh effects in foreground portions of the scene.

Figure 4A:
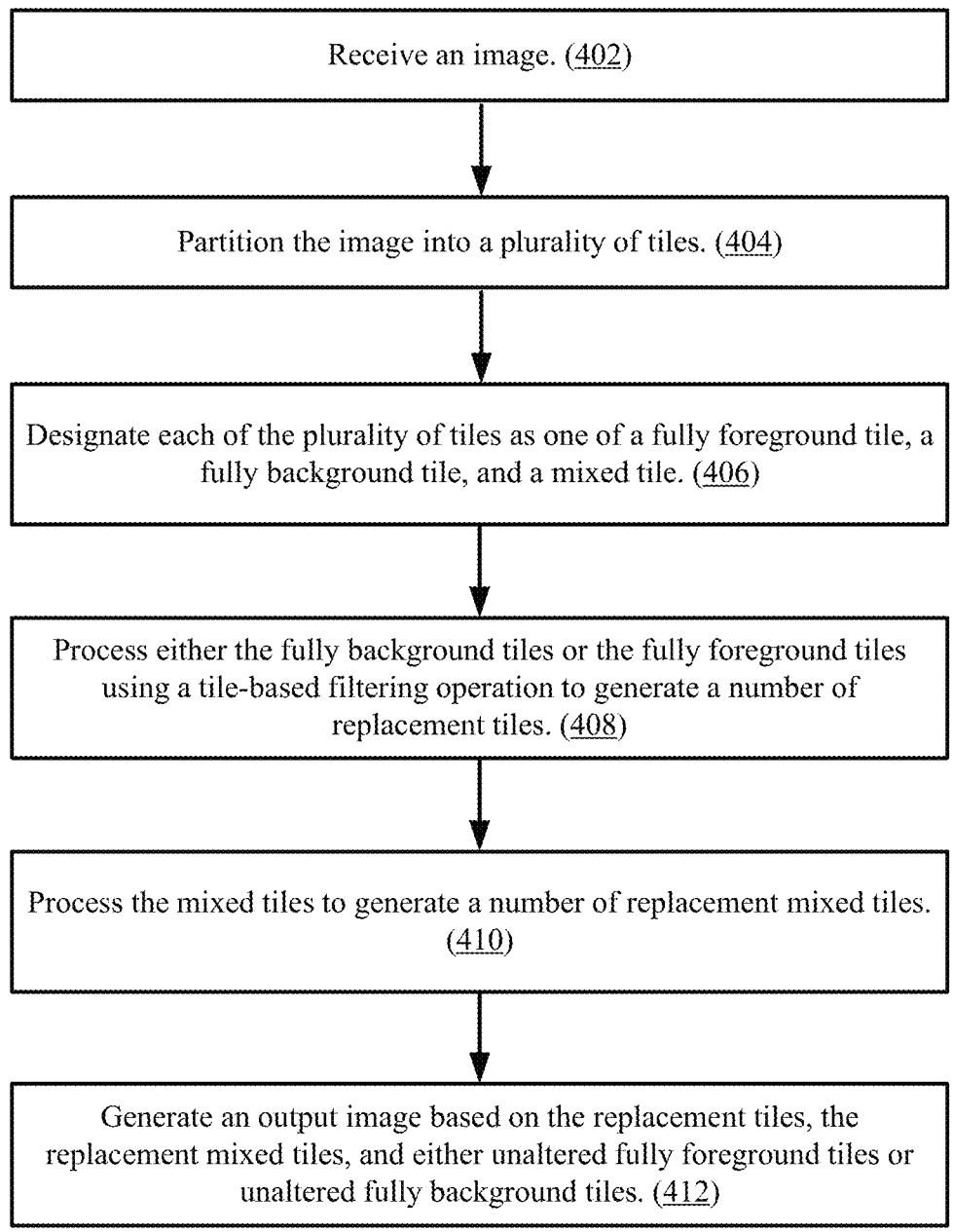
FIG. 4A is an illustrative flow chart depicting an example operation for generating real-time bokeh in images.

FIG. 4A is an illustrative flow chart depicting an example operation 400 for generating real-time bokeh in captured, received, or stored images. Although the example operation 400 is described below with respect to the wireless device 200 of FIG. 2, it is to be understood that the example operation 400 may be performed by any suitable mobile device (such as any of the devices of FIGS. 1A-1H) or by any suitable stationary device (such as a desktop computer or a security camera).

The wireless device 200 may receive an image (402). In some implementations, the image may be captured using the camera 202 and the image sensor 204 of FIG. 2. In other implementations, the image may be captured using multiple cameras of the wireless device 200. In some other implementations, the image may be provided to the wireless device 200 by another device. In some aspects, the image may be an image captured by the image sensor 204 and provided to the camera controller 210 for processing. In other aspects, the image may be a preview image (such as presented to a user via the display 240 of the device 200). In still other aspects, the image may be an image stored in a suitable memory (such as the memory 230) of the device 200.

The wireless device 200 may partition the image into a plurality of tiles (404). The image may be partitioned into any suitable number of tiles. In some aspects, the image may be partitioned into 256 tiles, for example, as described above with respect to the example of FIGS. 3A and 3B.

The wireless device 200 may designate each of the plurality of tiles as one of a fully foreground tile, a fully background tile, and a mixed tile (406). In some aspects, a tile may be designated as a fully foreground tile based on a determination that each pixel in the tile is a foreground pixel, and a tile may be designated as a fully background tile based on a determination that each pixel in the tile is a background pixel. In other aspects, a tile may be designated as a fully foreground tile if more than a certain proportion or percentage of its pixels can be designated as foreground pixels, and may be designated as a fully background tile if more than a certain proportion or percentage of its pixels can be designated as background pixels. A tile including both foreground pixels and background pixels may be designated as a mixed tile.

The wireless device 200 may process either the fully background tiles or the fully foreground tiles using a tile-based filtering operation to generate a number of replacement tiles (408). In some implementations, the tile-based filtering operation may add blurring effects (such as by adding noise, a Gaussian blur, or a defocus blur) to the fully background tiles to generate the replacement tiles. In other implementations, the tile-based filtering operation may add blurring effects (such as by adding noise, a Gaussian blur, or a defocus blur) to the fully foreground tiles to generate the replacement tiles. Thus, in some aspects, a defocus blur, a Gaussian blur, or noise may be used to add simulated Bokeh effects to either the fully background tiles or the fully foreground tiles. In other aspects, any other suitable filtering technique may be used to add simulated Bokeh effects to either the fully background tiles or the fully foreground tiles.

The wireless device 200 may process the mixed tiles to generate a number of replacement mixed tiles (410). In some implementations, the recursive partitioning and filtering operation may include iteratively partitioning a tile into a plurality of sub-tiles and processing the sub-tiles using the tile-based filtering operation to add blurring effects to either the background portions or the foreground portions of the scene appearing in the sub-tiles, for example, as described above with respect to FIGS. 3D and 3E. In some aspects, the recursive partitioning and filtering operation may continue until a level of granularity between the foreground and background portions of the scene is achieved.

The wireless device 200 may generate an output image based on the replacement tiles, the replacement mixed tiles, and either unaltered fully foreground tiles or unaltered fully background tiles (412). In some implementations, the fully background tiles of the image may be replaced by corresponding replacement tiles to generate the output image, the mixed tiles of the image may be replaced by corresponding replacement mixed tiles to generate the output image, and the unaltered fully foreground tiles may be inserted in the output image. For example, FIG. 4B is an illustrative flow chart depicting an example operation 420 for generating real-time bokeh in background portions of images. Although the example operation 420 is described below with respect to the wireless device 200 of FIG. 2, it is to be understood that the example operation 420 may be performed by any suitable mobile device (such as any of the devices of FIGS. 1A-1H) or by any suitable stationary device (such as a desktop computer or a security camera). The wireless device 200 may replace each of the fully background tiles with a corresponding one of the replacement tiles in the output image (422), may replace each of the mixed tiles with a corresponding one of the replacement mixed tiles in the output image (424), and may insert each of the unaltered fully foreground tiles in the output image (426).

In other implementations, the fully foreground tiles of the image may be replaced by corresponding replacement tiles to generate the output image, the mixed tiles of the image may be replaced by corresponding replacement mixed tiles to generate the output image, and the unaltered fully background tiles may be inserted in the output image. For example, FIG. 4C is an illustrative flow chart depicting an example operation 430 for generating real-time bokeh in foreground portions of images. Although the example operation 430 is described below with respect to the wireless device 200 of FIG. 2, it is to be understood that the example operation 430 may be performed by any suitable mobile device (such as any of the devices of FIGS. 1A-1H) or by any suitable stationary device (such as a desktop computer or a security camera). The wireless device 200 may replace each of the fully foreground tiles with a corresponding one of the replacement tiles in the output image (432), may replace each of the mixed tiles with a corresponding one of the replacement mixed tiles in the output image (434), and may insert each of the unaltered fully background tiles in the output image (436).

Figure 5:
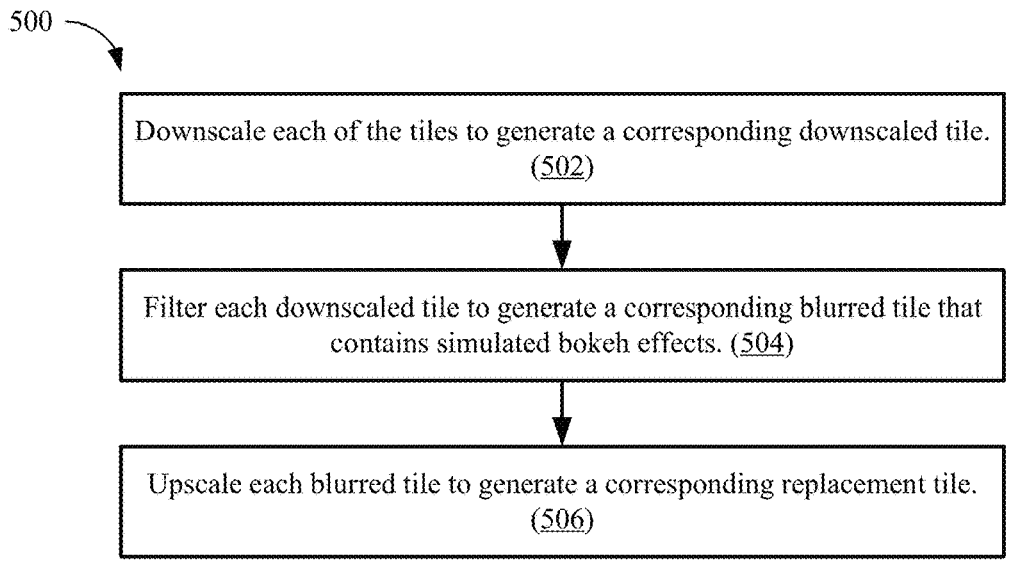
FIG. 5 is an illustrative flow chart depicting an example tile-based filtering operation.

FIG. 5 is an illustrative flow chart depicting an example tile-based filtering operation 500. Although the example operation 500 is described below with respect to the wireless device 200 of FIG. 2, it is to be understood that the example operation 500 may be performed by any suitable mobile device (such as any of the devices of FIGS. 1A-1H) or by any suitable stationary device (such as a desktop computer or a security camera). The example tile-based filtering operation 500 may be used to add blurring effects (such as bokeh effects) to either the fully background tiles or the fully foreground tiles of a partitioned image, for example, as described above with respect to FIG. 3C.

The wireless device 200 may downscale each of the tiles to generate a corresponding downscaled tile (502). In some aspects, the wireless device 200 may use a scaling factor N to generate the downscaled tile. The scaling factor N may be any suitable integer greater than one. In some implementations, the wireless device 200 may downscale the fully background tile 332 to generate a downscaled tile 333 having a resolution that is a fraction (such as 1/N) of the resolution of the fully background tile 332 (which corresponds to the original fully background tile 312A of the image 310), as depicted in the example of FIG. 3C. In other implementations, the wireless device 200 may downscale a fully foreground tile to generate a downscaled tile having a resolution that is a fraction (such as 1/N) of the resolution of the fully background tile.

The wireless device 200 may filter each downscaled tile to generate a corresponding blurred tile that contains simulated bokeh effects (504). In some implementations, the wireless device 200 may add blurring effects to the downscaled tile 333 using a suitable blurring filter to generate the blurred tile 334, as depicted in the example of FIG. 3C. The blurring filter may be any suitable filter or may implement any suitable blurring function (such as defocus blur or a Gaussian blur) to generate bokeh effects in the fully background tile 332 (or in any of the fully foreground tiles).

The wireless device 200 may upscale each blurred tile to generate a corresponding replacement tile (506). In some aspects, the wireless device 200 may use the scaling factor to upscale the blurred tiles. In some implementations, the wireless device 200 may upscale the blurred tile 334 to generate the replacement background tile 336, as depicted in the example of FIG. 3C. The replacement background tile 336 may have a resolution that is greater (such as N times greater) than the resolution of the downscaled tile 333 and the blurred tile 334. In some aspects, the replacement background tile 336 may have the same resolution as the original fully background tile 312A, for example, so that the replacement background tile 336 may replace the original fully background tile 312A to generate the output image. In other implementations, the wireless device 200 may upscale the blurred tile 334 to generate a replacement foreground tile. The replacement foreground tile may have a resolution that is greater (such as N times greater) than the resolution of the downscaled tile and the blurred tile. In some aspects, the replacement foreground tile 336 may have the same resolution as the original fully foreground tile, for example, so that the replacement foreground tile may replace the original fully foreground tile to generate the output image.

Figure 6:
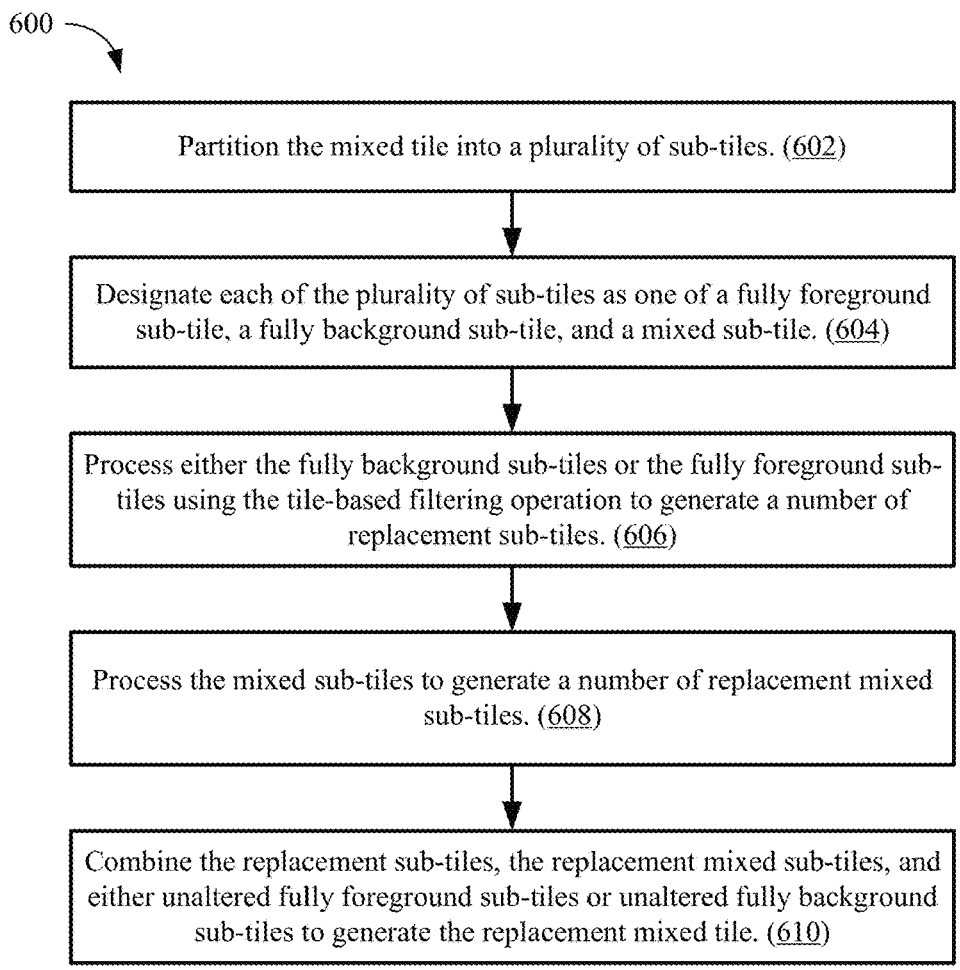
FIG. 6 is an illustrative flow chart depicting an example recursive partitioning and filtering operation.

FIG. 6 is an illustrative flow chart depicting an example recursive partitioning and filtering operation 600. Although the example operation 600 is described below with respect to the wireless device 200 of FIG. 2, it is to be understood that the example operation 600 may be performed by any suitable mobile device (such as any of the devices of FIGS. 1A-1H) or by any suitable stationary device (such as a desktop computer or a security camera). The example recursive partitioning and filtering operation 600 may be used to add blurring effects (such as bokeh effects) to either background portions or foreground portions of the scene appearing in the mixed sub-tiles of a partitioned tile, for example, as described above with respect to FIGS. 3D and 3E.

The wireless device 200 may partition each mixed tile into a plurality of sub-tiles (602), and may designate each of the plurality of sub-tiles as one of a fully foreground sub-tile, a fully background sub-tile, and a mixed sub-tile (604). In some implementations, the wireless device 200 may partition the mixed tile 342 to form a partitioned tile 345 including a plurality of sub-tiles 346, as depicted in the example of FIG. 3D. Each of the sub-tiles 346 may be designated either as a fully foreground sub-tile, as a fully background sub-tile, or as a mixed sub-tile. For example, as shown in the example of FIG. 3D, the partitioned tile 345 may include a number of fully background sub-tiles (such as the fully background sub-tile 346A), may include a number of a fully foreground sub-tiles (such as the fully foreground sub-tile 346B), and may include a number of a mixed sub-tiles (such as the mixed sub-tile 346C).

The wireless device 200 may process either the fully background sub-tiles or the fully foreground sub-tiles using the tile-based filtering operation to generate a corresponding replacement sub-tile (606). In some implementations, the wireless device 200 may add blurring effects to the fully background sub-tiles of the partitioned mixed tile 345 using a blurring filter, for example, in a manner similar to the operation 330 described above with respect to FIG. 3C. In some implementations, the wireless device 200 may add blurring effects to the fully foreground sub-tiles of the partitioned mixed tile using a blurring filter.

The wireless device 200 may process the mixed sub-tiles to generate a number of replacement mixed sub-tiles (608). In some implementations, the wireless device 200 may iteratively partition and filter each of the mixed sub-tiles until a level of granularity exists between the foreground and background portions of the scene appearing in the mixed tiles.

The wireless device 200 may combine the replacement sub-tiles, the replacement mixed sub-tiles, and either unaltered fully foreground sub-tiles or unaltered fully background sub-tiles to generate the replacement mixed tile (610). In some implementations, the fully background tiles of the image may be replaced by corresponding replacement background tiles to generate the output image, the mixed tiles of the image may be replaced by corresponding replacement mixed tiles to generate the output image, and unaltered fully foreground tiles may be inserted in the output image. In other implementations, the fully foreground tiles of the image may be replaced by corresponding replacement foreground tiles to generate the output image, the mixed tiles of the image may be replaced by corresponding replacement mixed tiles to generate the output image, and unaltered fully background tiles may be inserted in the output image.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as memory 230 in FIG. 2) comprising instructions that, when executed by one or more processors (such as the processor 220 of FIG. 2), performs a portion or all of the example operation 400 described above with respect to FIG. 4A. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples, and any means for performing the functionality described herein are included in aspects of the disclosure.

What is claimed is:

1. A method for generating bokeh effects in images performed by a mobile device, comprising:
   receiving an image;
   generating a depth map based on depth data corresponding to the image;
   partitioning the image and the depth map into a plurality of corresponding tiles;
   designating each of the depth map tiles as one of a fully foreground depth map tile, a fully background depth map tile, and a mixed depth map tile;
   designating each of the plurality of corresponding tiles of the image based on the designations of the depth map tiles as one of a fully foreground tile, a fully background tile, and a mixed tile;
   processing either the fully background tiles or the fully foreground tiles using a tile-based filtering operation to generate a number of replacement tiles;
   processing the mixed tiles to generate a number of replacement mixed tiles; and
   generating an output image based on the replacement tiles, the replacement mixed tiles, and either unaltered fully foreground tiles or unaltered fully background tiles.

2. The method of claim 1, wherein processing the mixed tiles comprises:
   recursively partitioning and filtering the mixed tiles until a level of granularity exists between foreground portions and background portions of the mixed tiles.

3. The method of claim 2, wherein the recursively partitioning and filtering comprises, for each of the mixed tiles:
   partitioning the mixed tile into a plurality of sub-tiles;
   designating each of the plurality of sub-tiles as one of a fully foreground sub-tile, a fully background sub-tile, and a mixed sub-tile;
   processing either the fully background sub-tiles or the fully foreground sub-tiles using the tile-based filtering operation to generate a number of replacement sub-tiles;
   processing the mixed sub-tiles using a recursive partitioning and filtering operation to generate a number of replacement mixed sub-tiles; and
   combining the replacement sub-tiles, the replacement mixed sub-tiles, and either unaltered fully foreground sub-tiles or unaltered fully background sub-tiles to generate the replacement mixed tile.

4. The method of claim 1, wherein generating the output image comprises:
   replacing each of the fully background tiles with a corresponding one of the replacement tiles in the output image;
   replacing each of the mixed tiles with a corresponding one of the replacement mixed tiles in the output image; and
   inserting each of the unaltered fully foreground tiles in the output image.

5. The method of claim 1, wherein generating the output image comprises:
   replacing each of the fully foreground tiles with a corresponding one of the replacement tiles in the output image;
   replacing each of the mixed tiles with a corresponding one of the replacement mixed tiles in the output image; and
   inserting each of the unaltered fully background tiles in the output image.

6. The method of claim 1, wherein the tile-based filtering operation comprises:
   downscaling each of the tiles to generate a corresponding downscaled tile;
   filtering each downscaled tile to generate a corresponding blurred tile that contains simulated bokeh effects; and
   upscaling each blurred tile to generate a corresponding replacement tile.

7. The method of claim 6, wherein the filtering comprises using at least one of a defocus blur, a Gaussian blur, and noise to generate the simulated bokeh effects.

8. The method of claim 1, wherein the designating of the depth map tiles comprises at least one of:
   designating a respective tile as a fully foreground depth map tile based on a number or percentage of foreground pixels in the respective tile exceeding a first threshold value; or
   designating the respective tile as a fully background depth map tile based on a number or percentage of background pixels in the respective tile exceeding a second threshold value.

9. A mobile device, comprising:
   one or more cameras;
   one or more processors; and
   a memory storing instructions that, when executed by the one or more processors, cause the mobile device to:
   receive an image;
   generate a depth map based on depth data corresponding to the image;
   partition the image and the depth map into a plurality of corresponding tiles;
   designate each of the depth map tiles as one of a fully foreground depth map tile, a fully background depth map tile, and a mixed depth map tile;
   designate each of the plurality of corresponding tiles of the image based on the designations of the depth map tiles as one of a fully foreground tile, a fully background tile, and a mixed tile;
   process either the fully background tiles or the fully foreground tiles using a tile-based filtering operation to generate a number of replacement tiles;
   process the mixed tiles to generate a number of replacement mixed tiles; and
   generate an output image based on the replacement tiles, the replacement mixed tiles, and either unaltered fully foreground tiles or unaltered fully background tiles.

10. The mobile device of claim 9, wherein execution of the instructions to process the mixed tiles causes the mobile device to:
   recursively partition and filter the mixed tiles until a level of granularity exists between foreground portions and background portions of the mixed tiles.

11. The mobile device of claim 10, wherein execution of the instructions to recursively partition and filter the mixed tiles causes the mobile device to, for each of the mixed tiles:
   partition the mixed tile into a plurality of sub-tiles;
   designate each of the plurality of sub-tiles as one of a fully foreground sub-tile, a fully background sub-tile, and a mixed sub-tile;

process either the fully background sub-tiles or the fully foreground sub-tiles using the tile-based filtering operation to generate a number of replacement sub-tiles;

process the mixed sub-tiles using a recursive partitioning and filtering operation to generate a number of replacement mixed sub-tiles; and combine the replacement sub-tiles, the replacement mixed sub-tiles, and either unaltered fully foreground sub-tiles or unaltered fully background sub-tiles to generate the replacement mixed tile.

12. The mobile device of claim 9, wherein execution of the instructions to generate the output image causes the mobile device to:

replace each of the fully background tiles with a corresponding one of the replacement tiles in the output image;

replace each of the mixed tiles with a corresponding one of the replacement mixed tiles in the output image; and insert each of the unaltered fully foreground tiles in the output image.

13. The mobile device of claim 9, wherein execution of the instructions to generate the output image causes the mobile device to:

replace each of the fully foreground tiles with a corresponding one of the replacement tiles in the output image;

replace each of the mixed tiles with a corresponding one of the replacement mixed tiles in the output image; and insert each of the unaltered fully background tiles in the output image.

14. The mobile device of claim 9, wherein the tile-based filtering operation comprises:

downscaling each of the tiles to generate a corresponding downscaled tile;

filtering each downscaled tile to generate a corresponding blurred tile that contains simulated bokeh effects; and upscaling each blurred tile to generate a corresponding replacement tile.

15. The mobile device of claim 14, wherein the filtering comprises using at least one of a defocus blur, a Gaussian blur, and noise to generate the simulated bokeh effects.

16. The mobile device of claim 9, wherein execution of the instructions to designate the depth map tiles causes the mobile device to perform at least one of:

designate a respective tile as a fully foreground depth map tile based on a number or percentage of foreground pixels in the respective tile exceeding a first threshold value; or designate the respective tile as a fully background depth map tile based on a number or percentage of background pixels in the respective tile exceeding a second threshold value.

17. A non-transitory computer-readable storage medium storing instructions that, when executed by one or more processors of a mobile device, cause the mobile device to perform operations comprising:

receiving an image;

generating a depth map based on depth data corresponding to the image;

partitioning the image and the depth map into a plurality of corresponding tiles;

designating each of the depth map tiles as one of a fully foreground depth map tile, a fully background depth map tile, and a mixed depth map tile;

designating each of the plurality of corresponding tiles of the image based on the designations of the depth map tiles as one of a fully foreground tile, a fully background tile, and a mixed tile;

processing either the fully background tiles or the fully foreground tiles using a tile-based filtering operation to generate a number of replacement tiles;

processing the mixed tiles to generate a number of replacement mixed tiles; and generating an output image based on the replacement tiles, the replacement mixed tiles, and either unaltered fully foreground tiles or unaltered fully background tiles.

18. The non-transitory computer-readable storage medium of claim 17, wherein execution of the instructions for processing the mixed tiles causes the mobile device to perform operations further comprising:

recursively partitioning and filtering the mixed tiles until a level of granularity exists between foreground portions and background portions of the mixed tiles.

19. The non-transitory computer-readable storage medium of claim 18, wherein the recursive partitioning and filtering comprises, for each of the mixed tiles:

partitioning the mixed tile into a plurality of sub-tiles;

designating each of the plurality of sub-tiles as one of a fully foreground sub-tile, a fully background sub-tile, and a mixed sub-tile;

processing either the fully background sub-tiles or the fully foreground sub-tiles using the tile-based filtering operation to generate a number of replacement sub-tiles;

processing the mixed sub-tiles using a recursive partitioning and filtering operation to generate a number of replacement mixed sub-tiles; and combining the replacement sub-tiles, the replacement mixed sub-tiles, and either unaltered fully foreground sub-tiles or unaltered fully background sub-tiles to generate the replacement mixed tile.

20. The non-transitory computer-readable storage medium of claim 17, wherein execution of the instructions for generating the output image causes the mobile device to perform operations further comprising:

replacing each of the fully background tiles with a corresponding one of the replacement tiles in the output image;

replacing each of the mixed tiles with a corresponding one of the replacement mixed tiles in the output image; and inserting each of the unaltered fully foreground tiles in the output image.

21. The non-transitory computer-readable storage medium of claim 17, wherein execution of the instructions for generating the output image causes the mobile device to perform operations further comprising:

replacing each of the fully foreground tiles with a corresponding one of the replacement tiles in the output image;

replacing each of the mixed tiles with a corresponding one of the replacement mixed tiles in the output image; and inserting each of the unaltered fully background tiles in the output image.

22. The non-transitory computer-readable storage medium of claim 17, wherein the tile-based filtering operation comprises:

downscaling each of the tiles to generate a corresponding downscaled tile;

filtering each downscaled tile to generate a corresponding blurred tile that contains simulated bokeh effects; and upscaling each blurred tile to generate a corresponding replacement tile.

23. The non-transitory computer-readable storage medium of claim 22, wherein the filtering comprises using at least one of a defocus blur, a Gaussian blur, and noise to generate the simulated bokeh effects.

24. The non-transitory computer-readable storage medium of claim 17, wherein designating the depth map tiles comprises at least one of:
  designating a respective tile as a fully foreground depth map tile based on a number or percentage of foreground pixels in the respective tile exceeding a first threshold value; or
  designating the respective tile as a fully background depth map tile based on a number or percentage of background pixels in the respective tile exceeding a second threshold value.

25. A mobile device for generating bokeh effects in images, comprising:
  means for receiving an image;
  means for generating a depth map based on depth data corresponding to the image;
  means for partitioning the image and the depth into a plurality of corresponding tiles;
  means for designating each of the depth map tiles as one of a fully foreground depth map tile, a fully background depth map tile, and a mixed depth map tile;
  means for designating each of the corresponding plurality of tiles of the image as one of a fully foreground tile, a fully background tile, and a mixed tile;
  means for processing either the fully background tiles or the fully foreground tiles using a tile-based filtering operation to generate a number of replacement tiles;
  means for processing the mixed tiles to generate a number of replacement mixed tiles; and
  means for generating an output image based on the replacement tiles, the replacement mixed tiles, and either unaltered fully foreground tiles or unaltered fully background tiles.

26. The mobile device of claim 25, wherein the means for generating the output image is to:
  replace each of the fully background tiles with a corresponding one of the replacement tiles in the output image;
  replace each of the mixed tiles with a corresponding one of the replacement mixed tiles in the output image; and
  insert each of the unaltered fully foreground tiles in the output image.

27. The mobile device of claim 25, wherein the means for generating the output image is to:
  replace each of the fully foreground tiles with a corresponding one of the replacement tiles in the output image;
  replace each of the mixed tiles with a corresponding one of the replacement mixed tiles in the output image; and
  insert each of the unaltered fully background tiles in the output image.

* * * * *